US011993827B2

(12) United States Patent
Albright et al.

(10) Patent No.: US 11,993,827 B2
(45) Date of Patent: May 28, 2024

(54) METHODS AND COMPOSITIONS FOR RECOVERY OF LITHIUM FROM LIQUID SOLUTIONS WITH NANOPARTICLES

(71) Applicant: Moselle Technologies, LLC, Farmers Branch, TX (US)

(72) Inventors: Robert L. Albright, Southampton, PA (US); Stanley M. Meyer, Maryville, IL (US)

(*) Notice: Subject to any disclaimer, the term of this patent is extended or adjusted under 35 U.S.C. 154(b) by 755 days.

(21) Appl. No.: 17/257,811

(22) PCT Filed: Jul. 5, 2019

(86) PCT No.: PCT/US2019/040698
§ 371 (c)(1),
(2) Date: Jan. 4, 2021

(87) PCT Pub. No.: WO2020/010313
PCT Pub. Date: Jan. 9, 2020

(65) Prior Publication Data
US 2021/0140011 A1 May 13, 2021

Related U.S. Application Data

(60) Provisional application No. 62/694,943, filed on Jul. 6, 2018.

(51) Int. Cl.
C22B 26/12 (2006.01)
B22F 1/05 (2022.01)
B22F 1/102 (2022.01)
C22B 3/24 (2006.01)
B82Y 30/00 (2011.01)
B82Y 40/00 (2011.01)

(52) U.S. Cl.
CPC ............... C22B 26/12 (2013.01); B22F 1/05 (2022.01); B22F 1/102 (2022.01); C22B 3/24 (2013.01); B82Y 30/00 (2013.01); B82Y 40/00 (2013.01)

(58) Field of Classification Search
None
See application file for complete search history.

(56) References Cited

U.S. PATENT DOCUMENTS

| | | | |
|---|---|---|---|
| 4,659,815 A | 4/1987 | Pacey et al. | |
| 4,734,376 A | 3/1988 | Pacey et al. | |
| 6,689,513 B1 | 2/2004 | Morigaki et al. | |
| 2010/0006509 A1 | 1/2010 | Hornes | |
| 2012/0082893 A1 | 4/2012 | Halalay et al. | |
| 2013/0189745 A1 | 7/2013 | Schwarz et al. | |
| 2015/0021511 A1 | 1/2015 | Kim et al. | |
| 2016/0280678 A1 | 9/2016 | Chung et al. | |
| 2017/0128952 A1 | 5/2017 | Oki et al. | |
| 2020/0384480 A1 | 12/2020 | Liu et al. | |

FOREIGN PATENT DOCUMENTS

| | | | |
|---|---|---|---|
| CL | 56183 | | 9/2011 |
| CL | 62769 | | 10/2019 |
| CN | 103386299 A | | 11/2013 |
| CN | 103755848 A | | 4/2014 |
| CN | 103785358 | * | 5/2014 |
| CN | 103785358 A | | 5/2014 |
| CN | 104120256 A | | 10/2014 |
| CN | 105646632 A | | 6/2016 |
| CN | 107626286 A | | 1/2018 |
| CN | 108083301 | * | 5/2018 |
| JP | S5647406 A | | 4/1981 |
| JP | H04317706 A | | 11/1992 |
| JP | 2014502309 A | | 1/2014 |
| JP | 2017131863 A | | 8/2017 |
| JP | 2018094551 | * | 6/2018 |
| KR | 20140118261 | * | 10/2014 |
| KR | 20140118261 A | | 10/2014 |
| KR | 101472381 B1 | | 12/2014 |
| RO | 112090 B1 | | 5/1997 |
| RO | 114953 B1 | | 9/1999 |
| WO | 2009040826 | * | 4/2009 |
| WO | 2012166104 | | 12/2012 |
| WO | 2014019501 A1 | | 2/2014 |
| WO | 2018035463 | * | 2/2018 |
| WO | 2020247037 | | 12/2020 |

OTHER PUBLICATIONS

Written Opinion of the International Searching Authority, PCT/US2019/040698 (Nov. 8, 2019).
Chilean Industrial Property Institute, Chilean Patent Application No. 202100019, search report dated Dec. 2, 2021.
Chilean Industrial Property Institute, Chilean Patent Application No. 202100019, expert report dated Dec. 2, 2021.
African Regional Intellectual Property Organization (ARIPO), Application No. AP/P/2021/012943, Search Report dated Sep. 6, 2022.
Ambashta, R. D. et al., "Chemical properties of nanoscale magnetite-based solvent extractant", Journal of Magnetism and Magnetic Materials, vol. 293, No. 1, May 1, 2005 (May 1, 2005), pp. 8-14, XP004882950, ISSN: 0304-8853, DOI: 10.1016/J.JMMM.2005.01.036, cited in European Search Report EP 19 83 0507 (Mar. 29, 2022).
Anonymous: "Crown Ether", Wikipedia, Nov. 29, 2021 (Nov. 29, 2021), pp. 1-4, XP055899353, Cited in European Search Report EP 20 81 8740 (Sep. 4, 2023).
Argentina National Institute of Industrial Property, Argentinian Patent Application No. P190101928, Office Action dated Aug. 29, 2023.
Brazilian Institute of Industrial Property, Application No. BR112021000161-1, Search Report dated Aug. 21, 2023 (English Translation).

(Continued)

Primary Examiner — Sheng H Davis

(57) ABSTRACT

The present disclosure relates, according to some embodiments, to a method for recovery of lithium ions from a lithium-ion containing liquid, the method comprising the steps of coating a nanoparticle with a styrene monomer; polymerizing the styrene monomer to form a poly-styrene-coated nanoparticle; attaching a dibenzo-12-crown-4-ether to the polystyrene-coated nanoparticle to form a lithium adsorbing medium; exposing the lithium ion-containing liquid to the lithium adsorbing medium to form a lithium-rich adsorbing medium; and extracting the lithium ion from the lithium-rich adsorbing medium.

32 Claims, 1 Drawing Sheet

(56) References Cited

OTHER PUBLICATIONS

Chilean Industrial Property Institute, Chilean Patent Application No. 202102679 Expert Examiner Report dated Feb. 10, 2023.
Chilean Industrial Property Institute, Chilean Patent Application No. 202102679, Search Report dated Feb. 10, 2023.
Cutsanu V et al: Iron (III) states in 4-vinylpyridine: Divinylbenzene copolymer modified by monochloracetic and acrylic acids:, Reactive and Functional Polymers, Elsevier, Amsterdam, NL, vol. 40, No. 2, May 15, 1999 (May 15, 1999), pp. 123-128, XP004164102, ISSN: 1381-5148, DOI: 10.1016/S1381-5148 (98) 00026-1, Cited in European Search Report EP 20 81 8740 (Sep. 4, 2023).
European Patent Office, Application No. EP 19830507.0-1103 / 3818186 PCT/US2019040698, Search Report dated Mar. 29, 2022.
European Patent Office, Application No. EP 20818740.1-1108 / 3981017 PCT/US2020021507, Search Report dated Sep. 4, 2023.
Giaveno et al: "Biological ferrous sulfate oxidation by A. ferrooxidans immobilized on chitosan beads", Journal of Microbiological Methods, Elsevier, Amsterdam, NL, vol. 72, No. 3, Jan. 10, 2008 (Jan. 10, 2008), pp. 227-234, XP022507096, ISSN: 0167-7012, Cited in European Search Report EP 20 81 8740 (Sep. 4, 2023).
Japanese Patent Office, Application No. 2021-521946, Office Action dated May 29, 2023 (English Translation).
Masteri-Farahani et al: "Organic-inorganic hybrid non-materials prepared from 4-formyl benzo-12-cown-4-ether and silica coated magnetite nanoparticles", Journal of Nanostructures, Mar. 1, 2012 (Mar. 1, 2012), pp. 191-197, XP055899237, DOI: 10.7508/JNS. 2011.03.002, cited in European Search Report EP 19 83 0507(Mar. 9, 2022).
Najorka Jens et al: "Single-crystal X-ray diffraction study of synthetic sodium-hydronium jarosite", Physics and Chemistry of Minerals, Springer, Berlin, DE, vol. 43, No. 5, Feb. 24, 2016 (Feb. 24, 2016), pp. 377-386, XP035872015, ISSN: 0342-1791, DOI: 10.1007/S00269-016-0802-0, Cited in European Search Report EP 20 81 8740 (Sep. 4, 2023).
Nejadshafiee Vahihe et al: "Magnetic bio-metal-organic framework nanocomposites decorated with folic acid conjugated chitosan as a promising biocompatible targeted theranostic system for cancer treatment", Materials Science and Engineering C, col. 99, May 10, 2017 (May 10, 2017), pp. 805-815, XP085641085. ISSN: 0928-4931, DOI: 10.1016/J.JSEC.2019-02-017, Cited in European Search Report EP 20 81 8740 (Sep. 4, 2023).
Qi Zeng:U et al: "Adsorption combined with superconducting high gradient magnetic separation technique used for removal of arsenic and antimony", Journal of Hazardous Materials, vol. 343, Sep. 7, 2017 (Sep. 7, 2017), pp. 36-48, XP085227762, ISSN: 0304-3894, DOI 10/1016/J.JHZMAT.2017.09.007, Cited in European Search Report EP 20 81 8740 (Sep. 4, 2023).
Tregubov A A et al: "Magnetic hybrid magnetite/metal organic framework nanoparticles: facile preparation, post-synthetic biofunctionalization and tracking in vivo with magnetic methods", Journal of Magnetism and Magnetic Materials, vol. 449, Feb. 6, 2019 (Feb. 6, 2019), pp. 590-596, XP058266255, ISSN: 0304-8853, DOI: 10.1016/J.JMMM.2017.10.070, Cited in European Search Report EP 20 81 8740 (Sep. 4, 2023).
Japanese Patent Office, Application No. 2021-521946, Office Action dated Feb. 6, 2024(English Machine Translation).

* cited by examiner

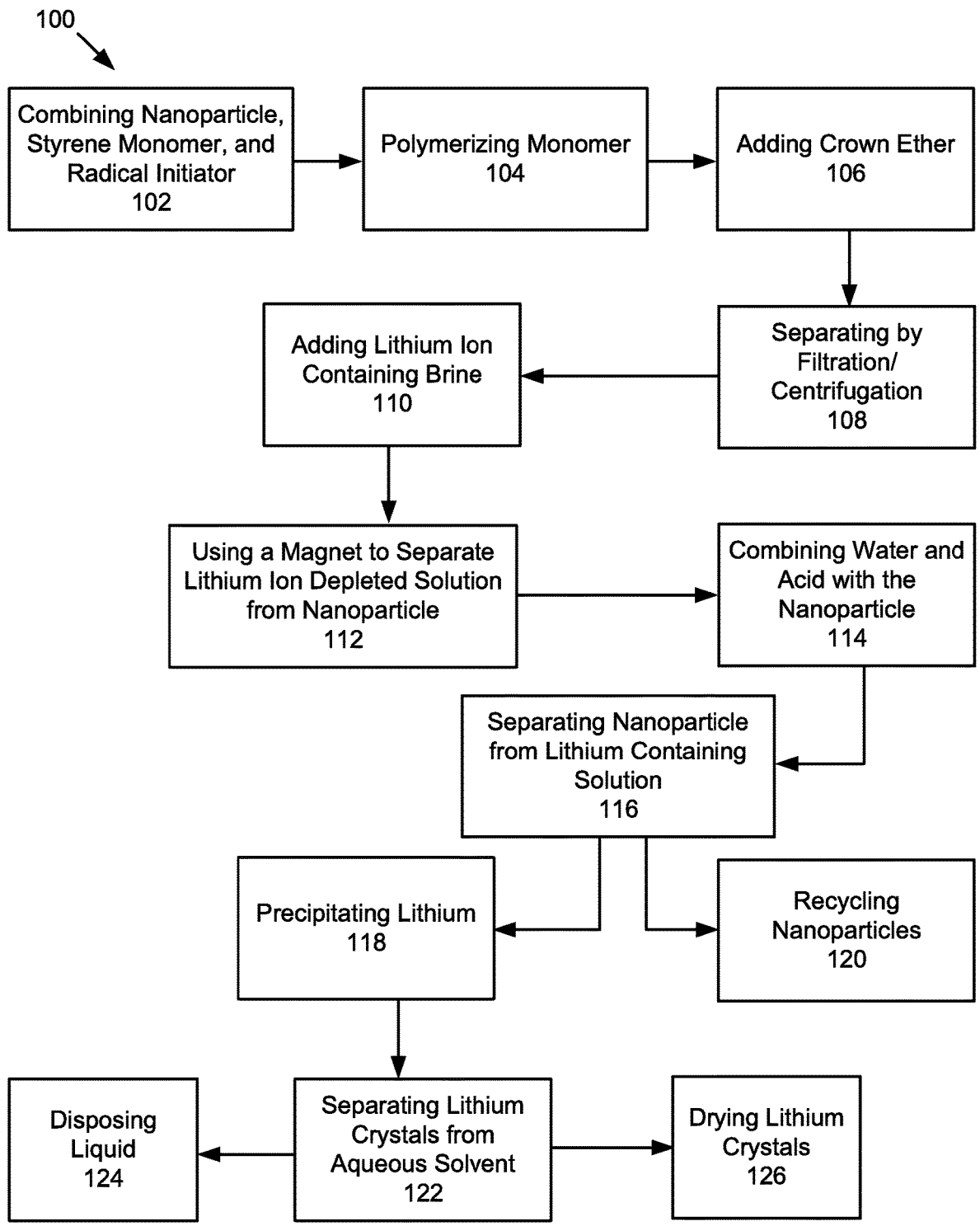

METHODS AND COMPOSITIONS FOR RECOVERY OF LITHIUM FROM LIQUID SOLUTIONS WITH NANOPARTICLES

BACKGROUND

The present disclosure relates, in some embodiments, to isolating lithium from aqueous sources.

Lithium and lithium salts have many uses that range from pharmaceuticals, ceramics, metallurgy, pyrotechnics, and military applications. The recent surge in renewable energy efforts has created a large demand for lithium to make rechargeable lithium ion batteries such as those for portable electronics and electric cars.

Most of the world's lithium is obtained by extracting brine water from underground pools, placing the brine water into ponds, and then letting the heat from the sun evaporate the ponds to leave the salt behind. This method is the most widely used today because the mining of lithium ores is much more expensive and is not economical. While solar evaporation is less expensive than direct mining of lithium ores, the product derived from solar evaporation is not pure and requires additional processing to separate the lithium salts from other salts found in the brine.

It would be desirable to selectively recover lithium salts from brine water in a stable form and with high purity.

BRIEF SUMMARY

According to an aspect, a method includes the steps of coating a nanoparticle with a styrene monomer; polymerizing the styrene monomer to form a polystyrene-coated nanoparticle; and attaching a crown ether to the polystyrene-coated nanoparticle to form a lithium adsorbing medium. The method may include exposing the lithium ion-containing liquid to the lithium adsorbing medium to form a lithium-rich adsorbing medium and a lithium-depleted liquid; and extracting the lithium ion from the lithium-rich adsorbing medium to form an extracted lithium ion and a recycled lithium-adsorbing medium.

According to an aspect, a lithium adsorbing medium for recovering lithium ions from a lithium-ion containing liquid includes a polystyrene-coated nanoparticle; and a crown ether, the lithium adsorbing medium prepared by a process including the steps of: coating a nanoparticle with a styrene monomer; polymerizing the styrene monomer to form the polystyrene-coated nanoparticle; attaching the crown ether to the polystyrene-coated nanoparticle to form a lithium adsorbing medium; exposing the lithium ion-containing liquid to the lithium adsorbing medium to form a lithium-rich adsorbing medium and a lithium-depleted liquid; and extracting the lithium ion from the lithium-rich adsorbing medium to form an extracted lithium ion and a recycled lithium-adsorbing medium.

In an example, the nanoparticles have a surface area from about 10 square meters per gram to about 5,000 square meters per gram. Nanoparticles may include a surface area from about 10 square meters per gram to about 500 square meters per gram. Nanoparticles may include a ferrous material such as magnetic iron. The nanoparticles may include a non-magnetic iron. Nanoparticles may include iron, ferrous iron, and iron oxide. A crown ether may include dibenzo-12-crown-4-ether, diaza-12-crown-4 ether, dibenzo-15-crown-5 ether, diaza-15-crown-5 ether, dibenzo-18-crown-6 ether, and diaza-18-crown-6 ether.

According to an aspect, a method includes separating an extracted lithium ion from a recycled lithium-adsorbing medium. In some embodiments, a lithium-rich adsorbing medium is magnetically separated from a lithium-depleted liquid. Extracting the lithium ion from the lithium-rich adsorbing medium may be performed by treating the lithium-rich adsorbing medium with a weak acid. The weak acid may include one or more of carbonic acid, acetic acid, phosphoric acid, hydrofluoric acid, oxalic acid, and combinations thereof.

According to an aspect, a method includes drying the precipitated lithium salt to form a dried lithium salt, and separating a lithium-rich adsorbing medium from lithium-depleted liquid by centrifugation. In some embodiments, the method includes separating the lithium-rich adsorbing medium from the lithium-depleted liquid by centrifugation. Polymerizing may provide for a preferred attachment site for a crown ether by limiting interference with the crown ether oxygens and the nanoparticle for the adsorption of the lithium ion. Polymerizing allows the nanoparticle to be used in an acidic condition and for the removal of the lithium ion from the lithium-rich adsorbing medium without or with limited degrading of the nanoparticle. Extracting may include exposing the lithium-rich adsorbing medium to a water containing a carbon dioxide. The extracted lithium ion may be precipitated to form a precipitated lithium salt, in which the precipitated lithium salt may include lithium carbonate, lithium silicate, lithium oxalate, and combinations thereof. Coating may include adding the nanoparticle to a solution containing the styrene monomer and a free radical initiator.

In some embodiments, a method for creating a lithium adsorbing medium, includes the steps of coating a nanoparticle with a styrene monomer; polymerizing the styrene monomer to form a polystyrene-coated nanoparticle; and attaching a dibenzo-12-crown-4-ether to the polystyrene-coated nanoparticle to form the lithium adsorbing medium.

According to some embodiments, a lithium adsorbing medium for recovering lithium ions from a lithium-ion containing liquid is provided. The lithium adsorbing medium may include a nanoparticle including an iron; a polystyrene coating a surface of the nanoparticle; and a crown ether attached to the polystyrene. The iron may include a magnetic iron, a non-magnetic iron, and combinations thereof. The crown ether may include dibenzo-12-crown-4-ether, diaza-12-crown-4 ether, dibenzo-15-crown-5 ether, diaza-15-crown-5 ether, dibenzo-18-crown-6 ether, and diaza-18-crown-6 ether. In some embodiments, greater than about 75% of the surface of the nanoparticle is coated with polystyrene. According to some embodiments, greater than about 95% of the surface of the nanoparticle is coated with the polystyrene.

BRIEF DESCRIPTION OF THE DRAWINGS

Some embodiments of the disclosure may be understood by referring, in part, to the present disclosure and the accompanying drawings, in which:

FIG. 1 illustrates a flow chart of a method for recovering lithium ions from a lithium ion containing liquid according to a specific example embodiment of the disclosure.

DETAILED DESCRIPTION

The present disclosure relates, in some embodiments, to methods and compositions for recovery of lithium from liquid solutions with nanoparticles. The liquid solutions may be naturally occurring brine sources. The methods and compositions may selectively extract lithium salts from brine solutions. Brine solutions include those obtained from seawater, saline lakes, shallow groundwater bines associated with saline or dry lakes, geothermal brines, and deep brines from sedimentary basins. For example, brine may come from Death Valley, California and from Argentina. Selectively extracting lithium salts may have the advantage over existing extraction methods of not requiring further isolation from other salts such as sodium and potassium salts. Additionally, the described nanoparticles may be recycled to reduce waste and cost of production of the nanoparticles. In some embodiments, magnetic nanoparticles may desirably permit magnetic separation of the nanoparticles from the brine once the lithium has been sequestered from the brine. Magnetic separation of the nanoparticles from the fluid is advantageous over traditional filtering methods since it can be used in a high throughput manner without requiring filters that get clogged up and must be replaced. A magnetic particle may include a ferrous material whether or not the ferrous material is in a magnetic state. The ferrous particle may be extracted by exposure to a magnetic field. The ferrous particle in a magnetic state may be extracted by exposure to another ferrous material and/or a magnetic field.

FIG. 1 illustrates a flow chart of a method for recovering lithium ions from a lithium ion containing liquid. As shown in FIG. 1, a method 100 includes combining 102 a nanoparticle, a styrene monomer, and a radical initiator. These elements can be combined in a glass or metal container and can be mixed with an overhead stirrer, a magnetic stir bar, shaken, and combinations thereof. Combining 102 can be performed in an aqueous solution. In some embodiments, combining 102 can be performed in other solvents including diethyl ether, hexanes, dichloromethane, toluene, ethanol, methanol, ethyl acetate, acetone, and mixtures thereof. While combining 102 the nanoparticle, the styrene monomer, and the radical initiator, the styrene monomer coats a surface of the nanoparticle through intermolecular forces including Van der Waals forces, dipole-dipole forces, and hydrogen bonding.

In the method 100, nanoparticles may include any metal including iron, magnetic iron, non-magnetic iron, and combinations thereof. For example nanoparticles may include any allotrope, iron (II) oxide, iron (III) oxide, and iron dioxide. The nanoparticles may have a surface area from about 10 square meters per gram to about 5,000 square meters per gram. Preferably, the nanoparticles may have a surface area of about 100 square meters per gram, or of about 500 square meters per gram. The inventors have discovered that a surface area of about 100 square meters per gram to about 500 square meters per gram advantageously provides a high number of attachment sites for lithium to promote efficient recovery while providing a nanoparticle of a size that facilitates capture of the nanoparticle. The radical initiator may include benzoyl peroxide, di-tert-butyl peroxide, methyl radical sources, benzoyloxyl radicals, methyl ethyl ketone peroxide, acetone peroxide, peroxydisulfate salts, halogen peroxides, azo compounds such as azobisisobutyronitrile (AIBN), and combinations thereof.

As shown in FIG. 1, in some embodiments, method 100 includes polymerizing 104 the monomer. Polymerizing 104 the monomer includes activating the radical initiator to initiate the polymerization process of the styrene monomers to form polystyrene-coated nanoparticles. Activating may include heating or inducing radical formation of the free radical initiator to instigate polymerization of the styrene monomer. Polymerization can be performed in an aqueous solution including water or in a solvent such as diethyl ether, hexanes, dichloromethane, toluene, ethanol, methanol, ethyl acetate, acetone, and mixtures thereof. In some embodiments, at least about 75% of the surface area of the nanoparticles is coated with the polystyrene. The inventors have discovered that when the coverage of the surface area of the nanoparticle is too low, the styrene monomer may fold thereby blocking sites that the crown ether may attach to. In preferred embodiments, at least about 75%, or more preferably all, of the surface area of the nanoparticle is coated with the polystyrene. Sufficiently covering the surface area of the nanoparticles with polystyrene advantageously provides for sites for a crown ether to bind in a high yield. If the polystyrene coverage is low, the crown ether has fewer sites to bind to, which lowers the metal-ion binding capabilities of the nanoparticles. The higher the polystyrene cover of the nanoparticles, the higher the binding yield of the crown ether on the polystyrene, thereby creating more crown ether sites on the nanoparticle to bind metal ions.

The method 100, as shown in FIG. 1, includes adding 106 a crown ether to the polystyrene-coated nanoparticles to form a metal ion adsorbing medium such as a lithium ion adsorbing medium. The crown ether may bind to the polystyrene-coated nanoparticles so that the crown ether may advantageously bind to metal salts including lithium, sodium, potassium, aluminum, cesium, magnesium, and combinations thereof. Crown ethers such as dibenzo-12-crown-4-ether may bind to the polystyrene coated nanoparticles through the dibenzo portion of the crown ether, thereby leaving the crown ether portion available to bind metal salts such a lithium. Crown ethers may bind to polystyrene coated nanoparticles through covalent bonds, pi-stacking, Van der Waals forces, dipole-dipole forces, and combinations thereof. In some embodiments, the crown ether includes dibenzo-12-crown-4-ether, diaza-12-crown-4 ether, dibenzo-15-crown-5 ether, diaza-15-crown-5 ether, dibenzo-18-crown-6 ether, or diaza-18-crown-6 ether. In some embodiments, dibenzo-15-crown-5 ether and diaza-15-crown-5 ether may be used to bind sodium metal ions. Methods and compositions using dibenzo-18-crown-6 ether and diaza-18-crown-6 ether may be used to bind potassium metal ions. Adding 106 a crown ether to the polystyrene-coated nanoparticles may be performed in an aqueous solution including water or in a solvent such as diethyl ether, hexanes, dichloromethane, toluene, ethanol, methanol, ethyl acetate, acetone, and mixtures thereof.

The methods 100, as shown in FIG. 1, includes separating 108 a metal ion adsorbing medium from the solvent and building blocks used to make it. Separating 108 can be performed through filtration, centrifugation, magnetization, and combinations thereof. After separating 108, the isolated metal ion adsorbing medium can be washed with a solvent including water to remove any unbound monomer or crown ether. In the method 100, a brine solution may then be added 110 to the metal ion adsorbing medium so that the metal ion adsorbing medium can adsorb one or more metal ions from the brine solution to form a metal-rich adsorbing medium and a metal-depleted liquid. For example, the method 100 includes exposing a lithium ion adsorbing medium to a brine solution rich in lithium to form a lithium-rich adsorbing medium and a lithium-depleted liquid.

According to some embodiments, if a magnetic nanoparticle is used, the method 100 includes using a magnet 112 to separate a metal ion depleted solution from the magnetic metal-rich adsorbing medium. This selectively sequesters the desired metal ion such as lithium via the nanoparticle from the other metal ions that remain in the brine solution. To remove the metal ion from the metal-ion rich adsorbing medium, the metal ion adsorbing medium may be combined 114 with an acid solution to form an extracted metal ion and a recycled metal-absorbing medium. For example, a lithium ion adsorbing medium may be combined 114 with an acid solution to form an extracted lithium ion and a recycled metal-absorbing medium. Acid solutions preferably include a weak acid such as carbonic acid, acetic acid, phosphoric acid, hydrofluoric acid, oxalic acid, and combinations thereof. While strong acids may also be used, they may damage the styrene coated nanoparticle thereby limiting the ability to recycle the nanoparticle.

According to some embodiments, the method 100 includes separating 116 a recycled metal-ion adsorbing medium from an extracted metal-ion. Separating includes filtration, centrifugation, magnetization, and combinations thereof. The recycled metal-ion adsorbing medium may be recycled 120 a number of times in either iterative processes to recover lithium from a single batch of a lithium-ion containing liquid to remove more lithium from that batch or may be used to remove lithium from multiple lithium-ion containing liquid batches. In some embodiments, a lithium-ion adsorbing medium may be used to adsorb lithium from a batch of a lithium-ion containing liquid at one site and then may be transported to another site to isolate the lithium from the lithium-rich adsorbing medium formed. Additionally, all method 100 steps may be performed at a single site.

As shown in FIG. 1, the method 100 includes precipitating 118 an extracted metal-ion to form a precipitated metal salt. For example, a method 100 includes precipitating 118 an extracted lithium ion to form a precipitated lithium salt, where the precipitated lithium salt includes lithium carbonate, lithium silicate, lithium oxalate, and combinations thereof. To precipitate the metal salts, a carbonate, silicate, or oxalate source may be used. After precipitating 118, the metal salts may be separated 122 from the aqueous solvent through a filtration or centrifugation process. The separated aqueous solvent may be disposed 124 of and the separated metal salts may be dried 126. For example, lithium salts may be dried 126 through heat, under vacuum, and combinations thereof. Lithium salts may be dried through calcination including a thermal treatment process in the absence or limited supply of air or oxygen. In some embodiments, calcination may be advantageous where salt decomposition or contamination may occur.

According to some embodiments, the method may be used to make a metal adsorbing medium for recovering metal ions from a metal-ion containing liquid. For example, this disclosure relates to lithium adsorbing medium for recovering lithium ions from a lithium-ion containing liquid. The lithium ion adsorbing medium includes a nanoparticle including an ion, a nanoparticle coated with a polystyrene, and a crown ether attached to the polystyrene. Iron includes magnetic iron, non-magnetic iron, iron (II) oxide, iron (III) oxide, iron dioxide, and combinations thereof. Crown ethers include dibenzo-12-crown-4-ether, diaza-12-crown-4 ether, dibenzo-15-crown-5 ether, diaza-15-crown-5 ether, dibenzo-18-crown-6 ether, and diaza-18-crown-6 ether. The metal adsorbing medium may selectively bind a desired metal ion. Selectivity may be defined as follows:

Selectivity=((# of moles of desired metal ion)/(# of moles of undesired metal ion))×100%

Inorganic nanomaterials have unique physical properties. This application discusses the combination of nanoparticles, coating procedures, and use of crown ethers to achieve recovery of lithium from the liquids. Separation of lithium ions from streams of cations including alkali metals of sodium and potassium is difficult. The selective functional ring group dibenzo-12-crown-4-ether has a high selectivity for lithium. The magnetic nanoparticles are covered or coated with polystyrene by polymerizing styrene over the surface of the magnetic nanoparticles. The polystyrene covering of the magnetic nanoparticles provides for the attachment of the dibenzo-12-crown-4-ether via the benzene rings of the crown ether and thereby allows the cyclic ether to be available to adsorb the lithium cation.

The iron nanoparticle is covered by polymerizing styrene monomer over the nanoparticle surface followed by attaching the crown ether via adsorption of the benzene ring of the dibenzo-12-crown-4-ether ring.

The nanoparticle is added to a solution containing a free radical initiator and styrene monomer. The nanoparticle maybe separated through use of the magnetic properties of the nanoparticles or other particle separation techniques such as centrifugation or filtration. The styrene monomer is then polymerized to coat the nanoparticles. The crown ether is then added as a liquid above its freezing point of 16° C. and below its boiling point of 70° C. The material is agitated to allow the crown ether to adsorb on the styrene polymer coating.

The crown ether rich magnetic nanoparticles are added to the liquid containing the lithium ion. This can either be as slurry or a solid. The crown ether coated particles preferentially adsorb the lithium from the brine or liquid. The nanoparticles can then be removed from the liquid stream utilizing their magnetic properties or through industrial techniques such as filtration or centrifugation.

The lithium containing nanoparticles are then extracted to put the lithium in solution. The extractants can be one of several acids or water that has been treated with a weak acid such as carbonic acid, acetic acid, phosphoric acid, hydrofluoric acid, oxalic acid, and combinations thereof. The dissolved lithium is then precipitated through the use of carbonate, silicate or oxalate, ion.

As will be understood by those skilled in the art who have the benefit of the instant disclosure, other equivalent or alternative compositions and methods, and systems for recovery of lithium from liquid solutions with nanoparticles can be envisioned without departing from the description contained herein. Accordingly, the manner of carrying out the disclosure as shown and described is to be construed as illustrative only.

Persons skilled in the art may make various changes in the shape, size, number, and/or arrangement of components or method steps without departing from the scope of the instant disclosure. For example, the number of crown ethers may be varied. In some embodiments, crown ethers may be interchangeable. Interchangeability may allow isolation of different types of salts. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Where open terms such as "having" or "comprising" are used, one of ordinary skill in the art having the benefit of the instant disclosure will appreciate that the disclosed features or steps optionally may be combined with additional features or steps. Such option may not be exercised and, indeed, in some embodiments, disclosed systems, compositions, apparatuses, and/or methods may exclude any other features or steps beyond those disclosed herein. Elements, compositions, devices, systems, methods, and method steps not recited may be included or excluded as desired or required. Persons skilled in the art may make various changes in methods of preparing and using a composition and a method of the disclosure.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. In addition, it may be desirable, in some embodiments, to mix and match range endpoints.

All or a portion of a method or composition for recovery of lithium from liquid solutions with nanoparticles may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

The invention claimed is:

1. A method for recovery of lithium ions from a lithium-ion containing liquid, the method comprising:
   coating a nanoparticle with a styrene monomer;
   polymerizing the styrene monomer to form a polystyrene-coated nanoparticle;
   attaching a crown ether to the polystyrene-coated nanoparticle to form a lithium adsorbing medium;
   exposing the lithium-ion containing liquid to the lithium adsorbing medium to form a lithium-rich adsorbing medium and a lithium-depleted liquid; and
   extracting the lithium ion from the lithium-rich adsorbing medium to form an extracted lithium ion and a recycled lithium-adsorbing medium;
   wherein the nanoparticle includes a ferrous material.

2. The method of claim 1, wherein the nanoparticle has a surface area from about 10 square meters per gram to about 5,000 square meters per gram.

3. The method of claim 1, wherein the nanoparticle has a surface area from about 100 square meters per gram to about 500 square meters per gram.

4. The method of claim 1, further comprising magnetically separating the lithium-rich adsorbing medium from the lithium-depleted liquid.

5. The method of claim 1, wherein the nanoparticle includes a non-magnetic iron.

6. The method of claim 1, wherein extracting the lithium ion from the lithium-rich adsorbing medium includes treating the lithium-rich adsorbing medium with a weak acid.

7. The method of claim 6, wherein the weak acid includes at least one of carbonic acid, acetic acid, phosphoric acid, hydrofluoric acid, oxalic acid, and combinations thereof.

8. The method of claim 1, further comprising separating the extracted lithium ion from the recycled lithium-adsorbing medium.

9. The method according to claim 8, further comprising precipitating the extracted lithium ion to form a precipitated lithium salt, wherein the precipitated lithium salt includes at least one of lithium carbonate, lithium silicate, lithium oxalate, and combinations thereof.

10. The method of claim 9, further comprising drying the precipitated lithium salt to form a dried lithium salt.

11. The method of claim 10, wherein the crown ether includes dibenzo-12-crown-4-ether.

12. The method according to claim 1, wherein the crown ether includes at least one of dibenzo-12-crown-4-ether, diaza-12-crown-4 ether, dibenzo-15-crown-5 ether, diaza-15-crown-5 ether, dibenzo-18-crown-6 ether, and diaza-18-crown-6 ether.

13. The method of claim 1, further comprising separating the lithium-rich adsorbing medium from the lithium-depleted liquid by centrifugation.

14. The method of claim 1, wherein the polystyrene-coated nanoparticle is stable such that exposing the polystyrene-coated nanoparticle to an acidic condition does not degrade the polystyrene-coated nanoparticle.

15. The method of claim 1, wherein the extracting includes exposing the lithium-rich adsorbing medium to a water containing a carbon dioxide.

16. The method of claim 1, wherein the coating includes adding the nanoparticle to a solution containing the styrene monomer.

17. The method of claim 1, wherein:
   the polymerizing includes adding a free radical initiator to the styrene monomer, and
   the free radical initiator includes at least one of benzoyl peroxide, di-tert-butyl peroxide, a methyl radical source, a benzoyloxyl radical, methyl ethyl ketone peroxide, acetone peroxide, a peroxydisulfate salt, halogen peroxide, an azo compound such as azobisisobutyronitrile, and combinations thereof.

18. A lithium adsorbing medium for recovering lithium ions from a lithium-ion containing liquid, the lithium adsorbing medium comprising:
   a nanoparticle including a ferrous material;
   a polystyrene coating a surface of the nanoparticle; and
   a crown ether attached to the polystyrene.

19. The lithium adsorbing medium of claim 18, wherein the ferrous material includes at least one of a magnetic iron, a non-magnetic iron, and combinations thereof.

20. The lithium adsorbing medium of claim 18, wherein the crown ether includes at least one of dibenzo-12-crown-4-ether, diaza-12-crown-4 ether, dibenzo-15-crown-5 ether, diaza-15-crown-5 ether, dibenzo-18-crown-6 ether, and diaza-18-crown-6 ether.

21. The lithium adsorbing medium of claim 20, wherein the crown ether includes dibenzo-12-crown-4-ether.

22. The lithium adsorbing medium of claim 21, further comprising a lithium ion attached to the dibenzo-12-crown-4-ether.

23. The lithium adsorbing medium of claim 18, wherein greater than about 75% of a surface of the nanoparticle is coated with polystyrene.

24. The lithium adsorbing medium of claim 18, wherein greater than about 95% of a surface of the nanoparticle is coated with the polystyrene.

25. A method for recovery of lithium ions from a lithium-ion containing liquid, the method comprising:
   coating a nanoparticle with a styrene monomer;
   polymerizing the styrene monomer to form a polystyrene-coated nanoparticle;
   attaching a crown ether to the polystyrene-coated nanoparticle to form a lithium adsorbing medium;
   exposing the lithium-ion containing liquid to the lithium adsorbing medium to form a lithium-rich adsorbing medium and a lithium-depleted liquid; and
   extracting the lithium ion from the lithium-rich adsorbing medium to form an extracted lithium ion and a recycled lithium-adsorbing medium;
   wherein the nanoparticle includes a non-magnetic iron.

26. A method for recovery of lithium ions from a lithium-ion containing liquid, the method comprising:
coating a nanoparticle with a styrene monomer;
polymerizing the styrene monomer to form a polystyrene-coated nanoparticle;
attaching a crown ether to the polystyrene-coated nanoparticle to form a lithium adsorbing medium;
exposing the lithium-ion containing liquid to the lithium adsorbing medium to form a lithium-rich adsorbing medium and a lithium-depleted liquid; and
extracting the lithium ion from the lithium-rich adsorbing medium to form an extracted lithium ion and a recycled lithium-adsorbing medium;
wherein extracting the lithium ion from the lithium-rich adsorbing medium includes treating the lithium-rich adsorbing medium with a weak acid.

27. A method for recovery of lithium ions from a lithium-ion containing liquid, the method comprising:
coating a nanoparticle with a styrene monomer;
polymerizing the styrene monomer to form a polystyrene-coated nanoparticle;
attaching a crown ether to the polystyrene-coated nanoparticle to form a lithium adsorbing medium;
exposing the lithium-ion containing liquid to the lithium adsorbing medium to form a lithium-rich adsorbing medium and a lithium-depleted liquid;
extracting the lithium ion from the lithium-rich adsorbing medium to form an extracted lithium ion and a recycled lithium-adsorbing medium; and
separating the extracted lithium ion from the recycled lithium-adsorbing medium.

28. The method according to claim 27, further comprising precipitating the extracted lithium ion to form a precipitated lithium salt, wherein the precipitated lithium salt includes at least one of lithium carbonate, lithium silicate, lithium oxalate, and combinations thereof.

29. The method of claim 28, further comprising drying the precipitated lithium salt to form a dried lithium salt.

30. The method of claim 29, wherein the crown ether includes dibenzo-12-crown-4-ether.

31. A method for recovery of lithium ions from a lithium-ion containing liquid, the method comprising:
coating a nanoparticle with a styrene monomer;
polymerizing the styrene monomer to form a polystyrene-coated nanoparticle;
attaching a crown ether to the polystyrene-coated nanoparticle to form a lithium adsorbing medium;
exposing the lithium-ion containing liquid to the lithium adsorbing medium to form a lithium-rich adsorbing medium and a lithium-depleted liquid; and
extracting the lithium ion from the lithium-rich adsorbing medium to form an extracted lithium ion and a recycled lithium-adsorbing medium;
wherein the extracting includes exposing the lithium-rich adsorbing medium to a water containing a carbon dioxide.

32. A method for recovery of lithium ions from a lithium-ion containing liquid, the method comprising:
coating a nanoparticle with a styrene monomer;
polymerizing the styrene monomer to form a polystyrene-coated nanoparticle;
attaching a crown ether to the polystyrene-coated nanoparticle to form a lithium adsorbing medium;
exposing the lithium-ion containing liquid to the lithium adsorbing medium to form a lithium-rich adsorbing medium and a lithium-depleted liquid; and
extracting the lithium ion from the lithium-rich adsorbing medium to form an extracted lithium ion and a recycled lithium-adsorbing medium;
wherein the polymerizing includes adding a free radical initiator to the styrene monomer; and
wherein the free radical initiator includes at least one of benzoyl peroxide, di-tert-butyl peroxide, a methyl radical source, a benzoyloxyl radical, methyl ethyl ketone peroxide, acetone peroxide, a peroxydisulfate salt, halogen peroxide, an azo compound such as azobisisobutyronitrile, and combinations thereof.

* * * * *